US005887328A

United States Patent [19]

Rydin et al.

[11] Patent Number: 5,887,328

[45] Date of Patent: Mar. 30, 1999

[54] PULLER DEVICE

[75] Inventors: Per Uno Magnus Rydin, Amsterdam; Arjan Van Os, Alphen a/d Rijn, both of Netherlands

[73] Assignee: SKR Maintenance Products B.V., Mijdrecht, Netherlands

[21] Appl. No.: 992,409

[22] Filed: Dec. 17, 1997

[30] Foreign Application Priority Data

Dec. 20, 1996 [NL] Netherlands ........................... 1004861

[51] Int. Cl.[6] ........................................ B23P 19/04

[52] U.S. Cl. ........................................ 29/259; 29/261

[58] Field of Search ........................ 29/259, 260, 264, 29/261, 266, 256, 258

[56] References Cited

U.S. PATENT DOCUMENTS

| | | | |
|---|---|---|---|
| 1,268,285 | 6/1918 | Schilling | 29/259 |
| 1,436,081 | 11/1922 | Brockway | 29/259 |
| 1,470,310 | 10/1923 | Winchell | 29/261 |
| 1,879,331 | 9/1932 | Kulp et al. | 29/261 |
| 2,902,751 | 9/1959 | Sommer | 29/261 |
| 3,372,457 | 3/1968 | Selby et al. | 29/259 |
| 5,341,553 | 8/1994 | Herzhauser . | |
| 5,557,833 | 9/1996 | Pool | 29/261 |

FOREIGN PATENT DOCUMENTS

| | | | |
|---|---|---|---|
| A 1-028372 | 5/1939 | France . | |
| A 2-083114 | 12/1971 | France . | |
| C-660931 | 6/1938 | Germany . | |
| C-675758 | 5/1939 | Germany . | |
| B-294300 | 4/1969 | Germany . | |
| A 1-466928 | 3/1989 | U.S.S.R. . | |
| 269334 | 4/1927 | United Kingdom | 29/259 |
| A 2-004802 | 4/1979 | United Kingdom . | |

*Primary Examiner*—David A. Scherbel
*Assistant Examiner*—Lee Wilson
*Attorney, Agent, or Firm*—Oliff & Berridge, PLC

[57] ABSTRACT

A puller device for disassembling parts having a plurality of arms provided with claws to grip the parts. The arms are rotatably connected to a hub. A pushing member extends through the hub and engages the parts. A slidable positioning member located on an exterior of the hub and extending away from the hub in a radial direction moves the arms between a free position and a gripping position. The hub and slidable positioning member each have a handle bar that can be gripped by a user. The arms move towards the free position when the handle bar of the slidable positioning member is urged towards the handle bar of the hub.

12 Claims, 3 Drawing Sheets

PULLER DEVICE

The invention is related to a puller device for disassembling parts, comprising at least two arms provided with claws which are adapted to grip one of said parts and which are each rotatably connected to a hub, through which hub a pushing member extends adapted to rest against another of said parts, as well as a slidable positioning member for moving the arms between a free position and a gripping position.

Such a puller device is known from GB-A-2004802. It has a positioning disc, which resiliently biasses the arms of the puller device towards their closed position. Thereby, the arms are guided in a symmetrical manner, which provides a more convenient handling of the puller device.

As the arms of this known puller are generally in a closed position, they cannot directly be fitted onto the object to be disassembled. It needs a separate operation to open the arms, before the device can be fitted. To that end, one of the arms is to be abutted against said object, whereafter this arm is rotated somewhat, As a result, the positioning disc is displaced, thus allowing subsequently the other arms to rotate over the same distance as well.

Apart from the disadvantage of the need to preliminary open the arms against the resilient bias provided by the positioning disc, this known puller device suffers from the drawback that the arms can still move in an uncontrolled, non-synchronized way as soon as one of the arms is rotated towards a spread position.

The object of the invention is therefore to provide a puller device which is still easier to manipulate. This object is achieved in that both the hub and the positioning member have a handle bar means to be grasped by a user, which handle bar means when pulled to one another make the arms move towards their gripping position.

By pulling the handle bar means towards each other, it is ensured that the arms reach their free position in a controlled way, which make the application onto the parts to be disassembled easier. Moreover, both hands can be used for grasping the handle bar means, which makes also a rather heavy puller device easy to handle.

In particular, both the hub and the positioning means may have at least two corresponding grasp members, each pair of which being to be gripped by the hand of a user. Preferably, the hub and the positioning means may have a concentric circular grasping member for grasping by the hands of a user. These circular grasping members, for instance rings, make it possible to grip the puller device in any rotational position, which is a benefit when applying the puller device in a limited, cumbersome place.

The positioning member may be preloaded by a spring for pushing the handle bar means apart. Thus, the arms always return to their closed position when not in use.

The positioning means may comprise a plate having apertures through each of which an arm extends. These apertures are somewhat larger than the transverse dimension of an arm, such that the plate can slide with respect to the arms with little play. Thereby, it is ensured that the arms are all held in the same position, and will always move in unison.

In case the distance between points of rotation of each arm is smaller than the distance between the apertures, it is ensured that the arms will move towards their spread position when pulling the handle bar means towards each other. In case the distance between points of rotation of each arm is larger than the distance between the apertures or pins it is ensured that the arms will move towards their closed position when pulling the handle bar means towards each other. The choice between these two versions depends on whether the connection to the part to be disassembled is from the outside or through a possible hole in the middle of the part. The arms may have an inwardly or outwardly curved or bent shape depending on how one best connects them to the part to be disassembled.

Subsequently, the invention will further be described with reference to the owing figures.

Figure 1:
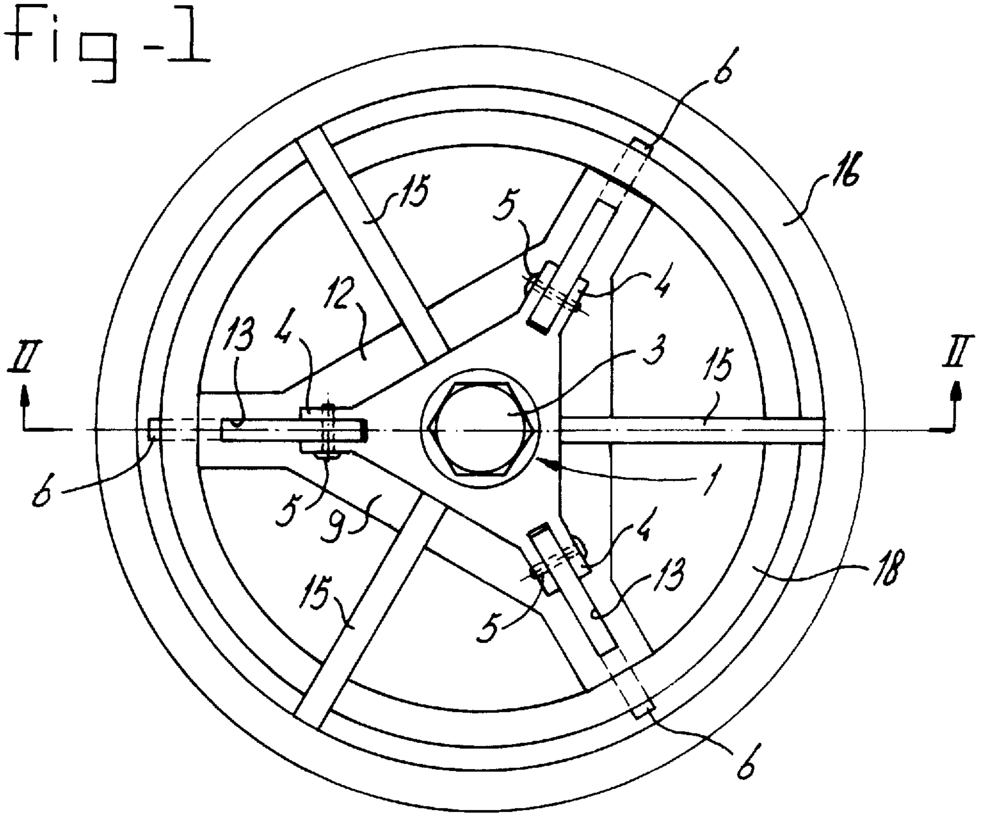
FIG. 1 shows a top view of the puller device according to the invention.

The puller device according to the invention has a central hub 1 provided with an internal screw thread with which the screw 2 operates. At its end, the screw is provided with a nut 3 for cooperation with a tool to rotate the screw. Any other force generating device, such as a hydraulic spindle, may be used instead of the screw.

The hub 1 is provided with three ears 4 onto which, by means of shafts 5, an arm 6 is rotatably mounted.

Each arm 6 at its other end has a claw 7 for cooperation with one of the parts to be disassembled.

The screw 2 has a point, for instance a ball shaped member 8, which is to be brought in cooperation with other of the parts to be disassembled. In the known way, by applying the claws 7 and the ball 8 in the appropriate position, and by subsequently screwing the screw 2 into the hub 1, the parts are subjected to forces which eventually lead to separation of those parts.

According to the invention, a positioning member 9 is slidably disposed around the hub 1. By means of spring 10, the positioning member 9 is constantly urged towards stop means 11.

The positioning member also comprises 3 branches 12, each provided with an aperture 13 through which the upper part 14 of each arm 6 extends. The apertures 13 are dimensioned such that the branches 12 may slide around the arms 6 with little play.

The hub has three spokes 15, the ends of which are interconnected by ring 16. Also on the positioning member 9, spokes 17 have been provided, which are interconnected by a ring 18.

The rings 16, 18 can easily be held by both hands. This means that the puller device in question can be manipulated easily. At the same time, these rings 16, 18 can be pulled towards one another, thus moving the arms 6 towards their closed position.

As a result, the puller device can easily be held in the right position, and subsequently, the arms can be hooked behind one of the parts to be gripped.

In that position, the puller device is at its proper place whereafter the puller device can be held in place with one of the hands while the other hand is used to rotate the screw 2.

Figure 3:
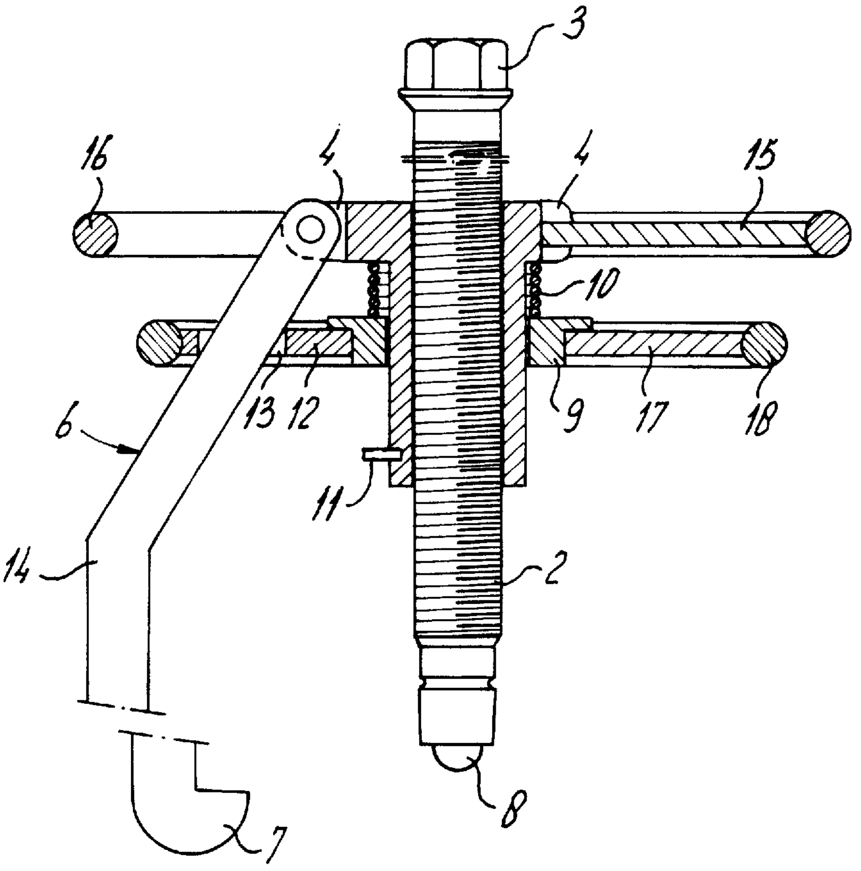
FIG. 3 shows the gripping position.

FIG. 3 shows the free, spread position of the arms, obtained by grasping the puller device and thereby moving the positioning member 9 upwardly. The spring 10 is thereby compressed, such that upon releasing the positioning member 9, the free position of is obtained.

Figure 4:
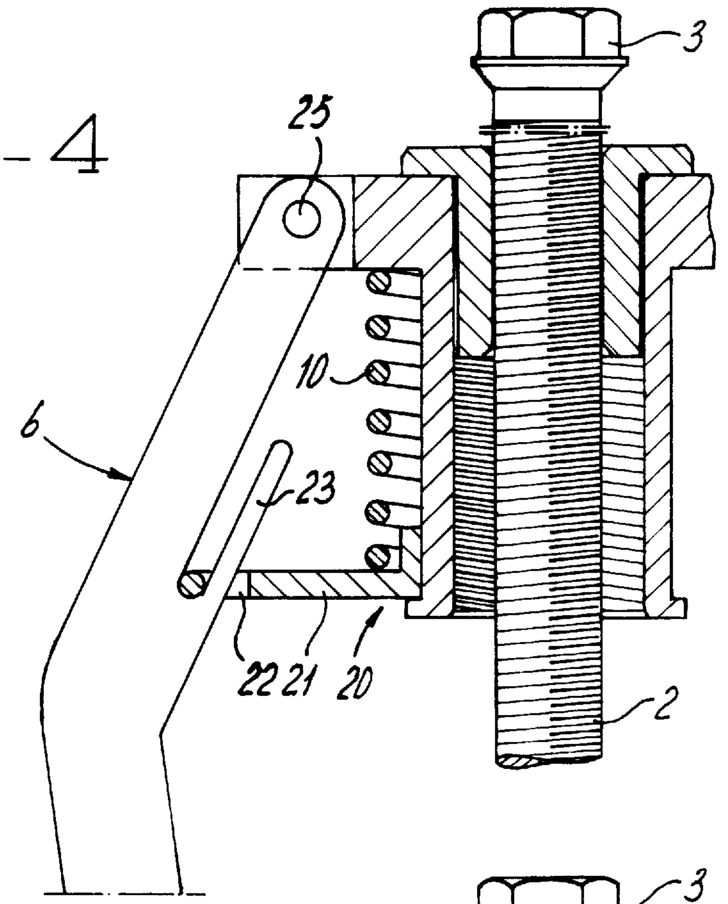
FIG. 4 shows a second embodiment.
Figure 5:
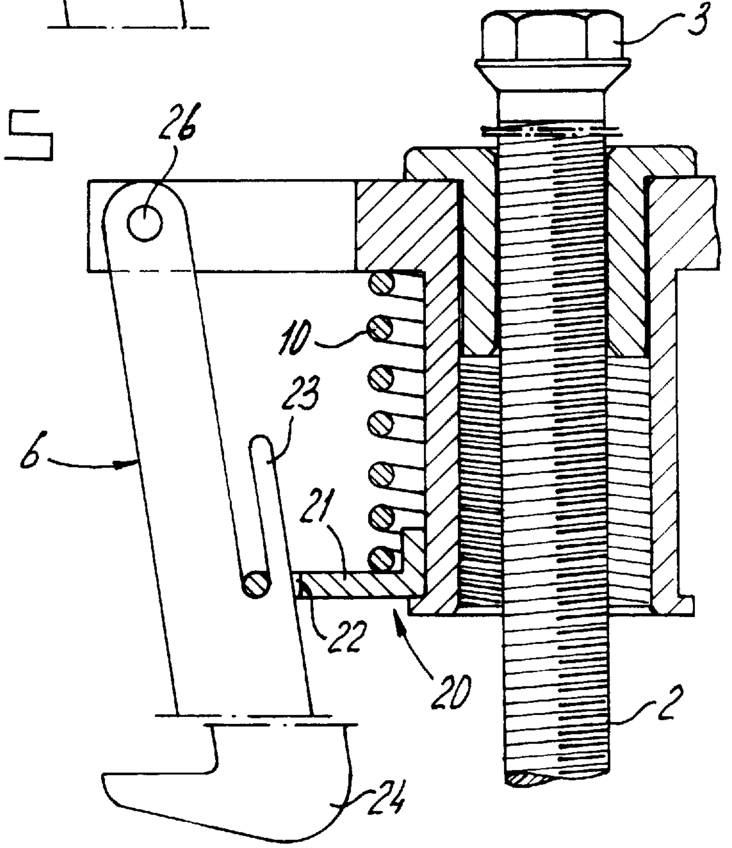
FIG. 5 shows a third embodiment.

In the embodiments of FIGS. 4 and 5, the arms 6 are steered by means of a finger 23 which projects in hole 22 of plate 21. The remaining parts of the positioning member 20 are identical to the positioning member 9 described in connection with FIGS. 3 and 4.

Figure 2:
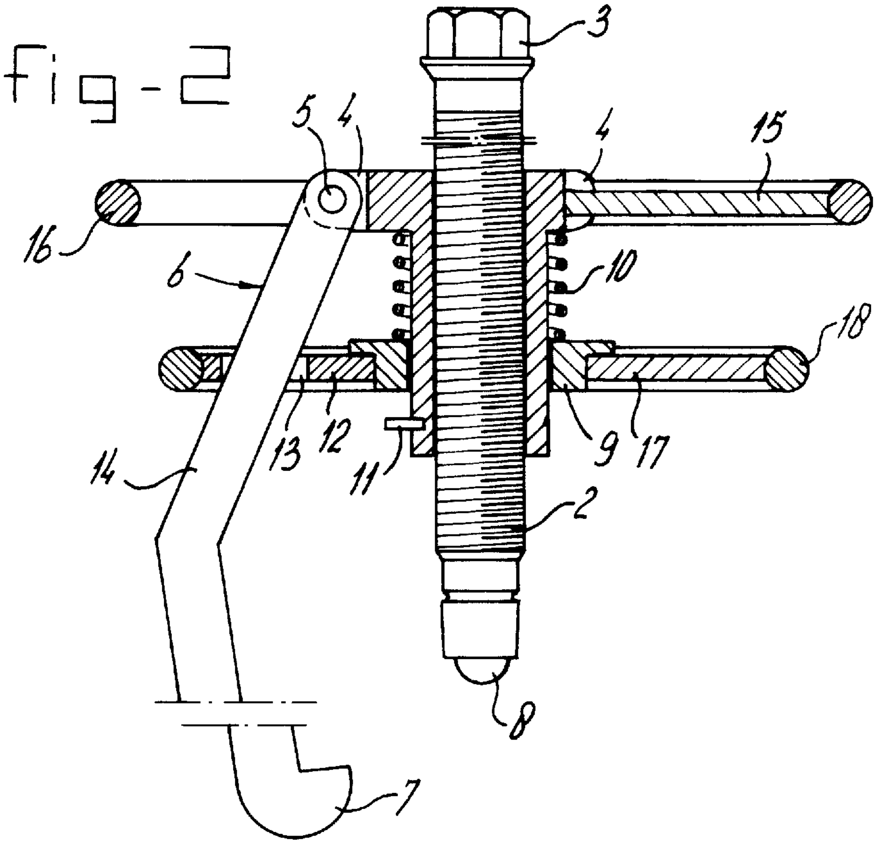
FIG. 2 shows a sideview, partly in cross-section, of the device according to FIG. 1.

The claws (not shown) of arms 6 of FIG. 3 are directed towards one another, as in the case of FIGS. 1 and 2. The relative position of hinge point 25 and apertures 22 is such that the arms move away from each other, when moving the positioning member 20 upwardly.

The claws 24 of arms 6 of FIG. 4 are facing away from each other. The relative position of hinge point 26 and apertures 22 is such that the arms 6 move towards each other, when moving the positioning member 20 upwardly.

We claim:

1. A puller device for disassembling parts comprising:

a hub;

at least two arms rotatable connected to the hub, each arm having a claw for gripping one of the parts;

a pushing member that extends through the hub and engages the parts; and a slidable positioning member located on an exterior of the hub and extending radially away from the hub, the slidable positioning member moving the arms between a free position and a gripping position, wherein both the hub and the slidable positioning member have handle bar means that move the arms toward the free position when an user urges the handle bar means of the slidable positioning member toward the handle bar means of the hub.

2. The puller device according to claim 1 wherein the hub and the slidable positioning means each have a plurality of spoke members, the spoke members of the hub correspond with the spoke members of the slidable positioning means to form pairs of corresponding spokes to be grasped by the user.

3. The puller device according to claim 1 wherein the hub and the slidable positioning means each have a concentric circular grasping member for grasping by the user.

4. The puller device according to claim 3 wherein the circular grasping member of the hub is connected to an end of each of the spoke members of the hub to form hub ears.

5. The puller device according to claim 1 wherein the slidable positioning member is preloaded by a spring for pushing the handle bar means of the slidable positioning member away from the handle bar means of the hub so that both handle bar means are moved away from a user gripping position.

6. The puller device according to claim 1 wherein the slidable positioning member comprises a plate having a plurality of apertures a portion of each said arm extends through a corresponding aperture.

7. The puller device according to claim 6 wherein the apertures are larger than a transverse dimension of each said arm such that the plate can slide with little play with respect to the arms.

8. The puller device according to claim 7 wherein a distance between points of rotation of each said arm is less than a distance between the apertures.

9. The puller device according to claim 8 wherein each said arm has an upper part extending away from the hub obliquely and a lower part extending toward the hub obliquely resulting in each said arm having a bent shape.

10. The puller device according to claim 1 wherein the claws point towards each other and urging the handle bar means of the slidable positioning member toward the handle bar means of the hub results in the arms moving towards a free, spread position.

11. The puller according to claim 1 wherein the claws point away from each other and urging the handle bar means of the slidable positioning member toward the handle bar means of the hub results in the arms moving towards a free, contracted position.

12. A puller device for disassembling parts comprising:

a hub having a bore along a longitudinal axis of the hub, the hub having an internal screw thread on an inner surface;

at least two arms rotatably connected to the hub, each arm provided with a claw for gripping one of the parts;

a pushing member having a threaded exterior for engaging the screw thread of the hub, the pushing member extending through the hub to engage the parts; and a slidable positioning member located on an exterior of the hub and extending radially away from the hub, the slidable positioning member moving the arms between a free position and a gripping position, wherein the slidable positioning member and the hub have handle bar means that move the arms toward the free position when an user urges the handle bar means of the slidable positioning member toward the handle bar means of the hub.

* * * * *